March 19, 1968 J. R. GARNETT 3,374,414
POWER SUPPLY APPARATUS CONVERTING D.C. TO
A STEPPED WAVE FOR APPROXIMATING
A SINE WAVE
Filed March 25, 1964 3 Sheets-Sheet 1

INVENTOR
JAMES R. GARNETT
BY
ATTORNEYS

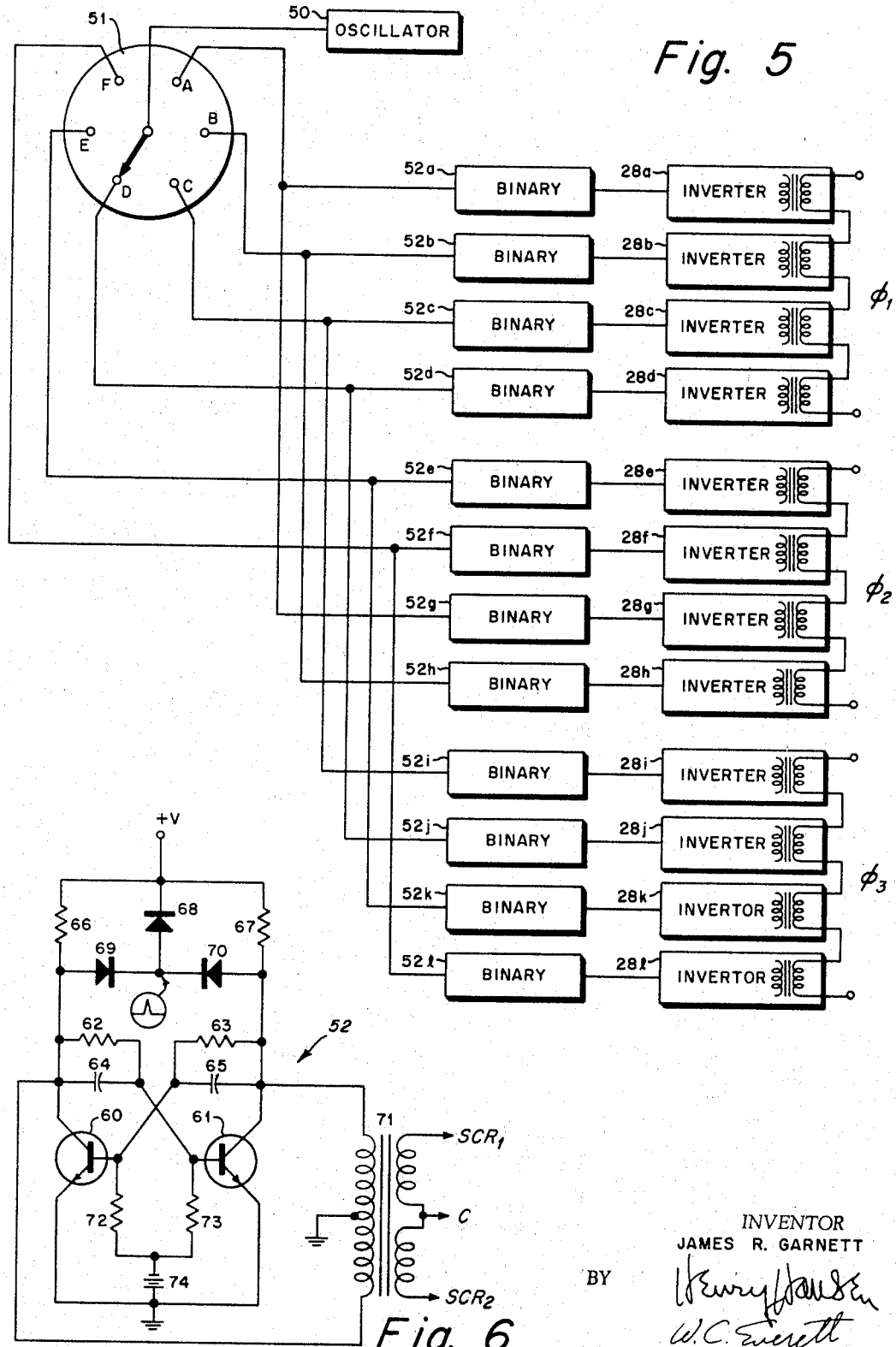

United States Patent Office 3,374,414
Patented Mar. 19, 1968

3,374,414
POWER SUPPLY APPARATUS CONVERTING D.C. TO A STEPPED WAVE FOR APPROXIMATING A SINE WAVE
James R. Garnett, Philadelphia, Pa., assignor to the United States of America as represented by the Secretary of the Navy
Filed Mar. 25, 1964, Ser. No. 354,807
6 Claims. (Cl. 321—5)

The invention described herein may be manufactured and used by or for the Government of the United States of America for governmental purposes without the payment of any royalties thereon or therefor.

The present invention relates to a constant voltage, constant frequency power supply for use in aircraft or other environments requiring high efficiency with light weight. More specifically, the invention is concerned with the provision of a stepped wave inverter which approximates a sine wave output rather than the usual square wave. A requirement of modern aircraft is constant frequency (e.g. 400 c.p.s.) A.C. (alternating current) electrical power having good sinusoidal waveforms containing no more than five percent total harmonic distortion. Present conventional systems use a mechanical or hydraulic constant speed drive, which acts as a speed converter between the aircraft engine and the A.C. alternators. Usually the constant speed drive is controlled by a servo so that the alternator shaft speed is maintained relatively constant. Because the output frequency from an alternator is proportional to its shaft speed, the output frequency is maintained relatively constant. The mechanical complexity of the constant speed drive and its associated controls creates frequent maintenance and reliability problems.

Voltage inverters operating from a D.C. (direct current) power supply powered by the aircraft engines have also been used. These inverters generally produced square wave outputs and required large signal inputs to control the frequency. The square wave outputs contain large amounts of harmonic distortion which renders the voltage supply useless for many aircraft applications. Presence of harmonic distortion requires filters to filter out the higher harmonics and in cases where the current was substantial (above 50 amperes) the size of the filters required grew excessive. In addition, the large filters required caused a large loss of efficiency, and required a high rate of heat dissipation and a high signal power in order to actuate them. Devices have been provided which provided high rates of efficiency with high power but these were so cumbersome as to be feasible only for the laboratory.

The sine wave approximation power supply of the present invention is light in weight, requires a low signal power and has low harmonic distortion, thereby obviating the necessity for large filters and providing a high rate of power with high efficiency. To attain this, the present invention contemplates a plurality of separate inverters driven out of phase, producing a stepped wave voltage in which the higher harmonics substantially cancel each other. By utilizing silicon controlled rectifiers the signal power required to actuate the inverters is substantially negligible. Because the higher harmonics substantially cancel each other, the size of the filters required is substantially reduced. A three phase power supply may also be produced with the present invention wherein three stepped wave voltages may be produced 120 degrees out of phase with each other.

Accordingly, it is an object of the present invention to provide a constant frequency power supply from a variable frequency generator (with low harmonic distortion obviating the need for large filters), and which is lightweight for use in aircraft.

Another object of the present invention is the provision of a three phase power supply with low harmonic distortion and high efficiency.

With these and other objects in view as will hereinafter more fully appear and which will be more particularly pointed out in the appended claims, reference is now made to the following description taken in connection with the accompanying drawings in which:

FIG. 5 shows a block schematic diagram of another embodiment of the invention including a three phase power supply using a six-stage ring counter;

FIG. 6 shows in more detail a binary and driver unit for the signals to inverters in the three phase power supply.

Figure 1:
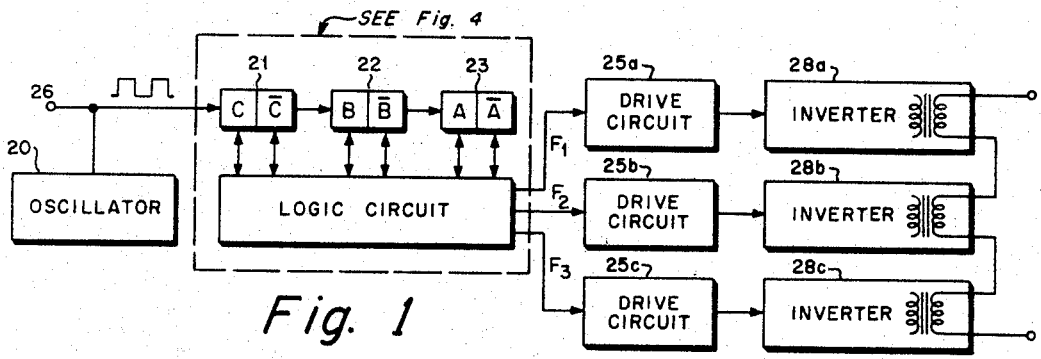
FIG. 1 shows a block schematic diagram of one embodiment of the present invention including a single phase power supply using a binary divide chain.
Figure 7:
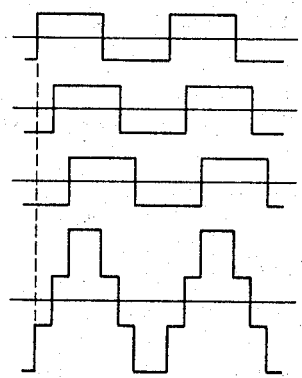
FIG. 7 represents waveforms in the embodiment of FIG. 1.

Turning now to FIG. 1, an oscillator 20 provides a signal frequency by means of two unijunction transistors in a relaxation oscillator circuit. The oscillator is well known and needs no description per se. The signal is supplied to the first of three binaries 21, 22 and 23. The responses of the three binaries to the incoming frequency are detected by a logic circuit 24 which supplies three square waves to three drive circuits 25a, 25b, and 25c. The logic circuit 24 keys the square wave supply to drive circuit 25a to the first of eight pulses, the square wave supply to drive circuit 25b to the second of eight pulses, and the square wave supply to drive circuit 25c to the third of eight pulses. By this means the three square waves provided to the three drive circuits are each one-eighth the frequency of the original oscillator 20 and the second and third are respectively 45° and 90° later in phase from the first square wave. In response to each of the three square waves the respective drive circuits provide two square waves 180° out of phase to two silicon controlled rectifier gates SCR1 and SCR2, respectively, of three inverter circuits 28. The three inverter circuits 28 provide three large current square waves through transformers to the outputs where the outputs are linked together. The net output as shown in FIG. 7 is the sum of the three square waves. This resultant stepped wave output approximates a sine wave with low harmonic distortion, as is shown by the exemplary data in the following table.

PERCENT OF HARMONIC CONTENT THROUGH 5th HARMONIC
[1st—400 c.p.s.: 100%]

| Wave | Harmonics | 2nd | 3rd | 4th | 5th |
|---|---|---|---|---|---|
| Square | Calculated | 0 | 33.3 | 0 | 20.0 |
|  | Measured | 1.5 | 33.5 | .5 | 20.0 |
| Stepped | Calculated | 0 | 13.8 | 0 | 8.3 |
|  | Measured | 2.8 | 6.3 | .8 | 2.9 |

As the table shows, it was discovered that the measured harmonic distortion was slightly over half of the expected distortion for three waves 45° out of phase and a small fraction of the distortion for one square wave. The measured distortion, which was approximately thirteen percent of the fundamental, is easily filtered without large filter equipment to the required five percent harmonic distortion needed for most aircraft power systems. The filters are known per se and are not described, as they form no part of the present invention.

Figure 2:
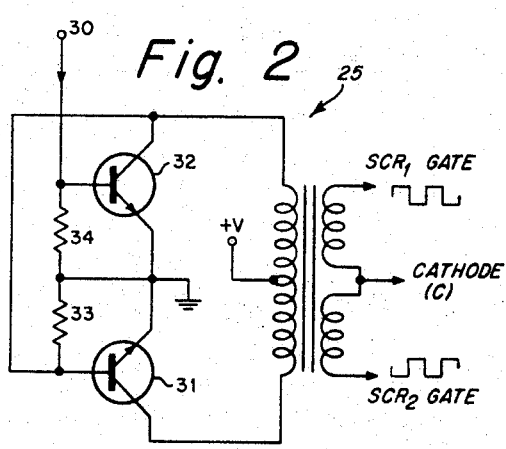
FIG. 2 shows in more detail a drive circuit of FIG. 1.

FIG. 2 shows the details of a drive circuit 25. The square wave voltage is inserted on a line 30 at the base of a transistor 32 which is suitably biased by a resistor 34. When there is a positive signal at the base of the transistor 32, it will conduct, thereby effectively grounding the collector and cutting almost to zero the voltage at the base of the transistor 31. When the transistor 32 is not conducting, its impedance is high thereby creating a signal into the base of the transistor 31 which then conducts. The result is to produce current alternately through the two halves of the input coil of a transformer 35 and by appropriate linkages in the output coil two square waves 180° out of phase with each other may be drawn off. The center tap of the output coil leads to the cathode of the inverter circuit 28. The two ends of the output lead to the two silicon controlled rectifier gates SCR1 and SCR2.

Although n-p-n transistors have been shown in FIG. 2, it will be understood that p-n-p type transistors are equally effective. In either event, the emitters comprise a set of common ends and the collectors comprise a set of common ends, either of which may be grounded, providing only that the polarity of the D-C voltage supply is set correctly.

Figure 3:
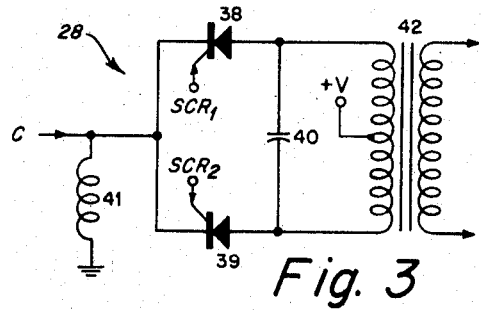
FIG. 3 shows in more detail an inverter circuit of FIG. 1 containing silicon controlled rectifiers with the output through a transformer coupling.

FIG. 3 shows the detail of the inverter circuits 28. The inverter circuit has two silicon controlled rectifiers 38, 39, having gates SCR1 and SCR2, respectively. Their anodes are linked by a commutating capacitance 40. Their cathodes are tied together with a link through a commutating inductance 41 to ground. These serve the function of biasing the rectifiers at cutoff during their nonconducting portion of the cycle to insure more effective cutoff and avoid large voltage and current swings. The silicon controlled rectifiers 38, 39 are such that when a positive voltage is placed across the gate, the impedance is effectively reduced to zero and the rectifier will conduct thereby causing flow of current in that loop of the transformer 42 to which the anodes of the rectifiers 38, 39 are connected as directed by a voltage supply connected to the center of that loop. The rectifiers will operate with a pulse or spike signal which is positive to zero, as for example, from the input along line 30 to the drive circuits 25. However, it is found that the cutoff action of the rectifiers 38, 39 will be more effective if a positive to negative square wave is used. The rectifiers 38, 39 are large power output transistors capable of handling 50 amperes or more. Since the voltage supply for each inverter is 28 volts customarily, the power capacity of each inverter may be as much as 1500 watts. For three outputs linked 45° out of phase, the total power output may be upwards of three kilowatts. The requirement of signal power to the silicon controlled rectifiers is very small being in the order of one watt or less. The system of FIG. 1 produces a step wave output which needs only a small amount of filtering to produce a sine wave approximation with less than 5 percent harmonic distortion.

Figure 4:
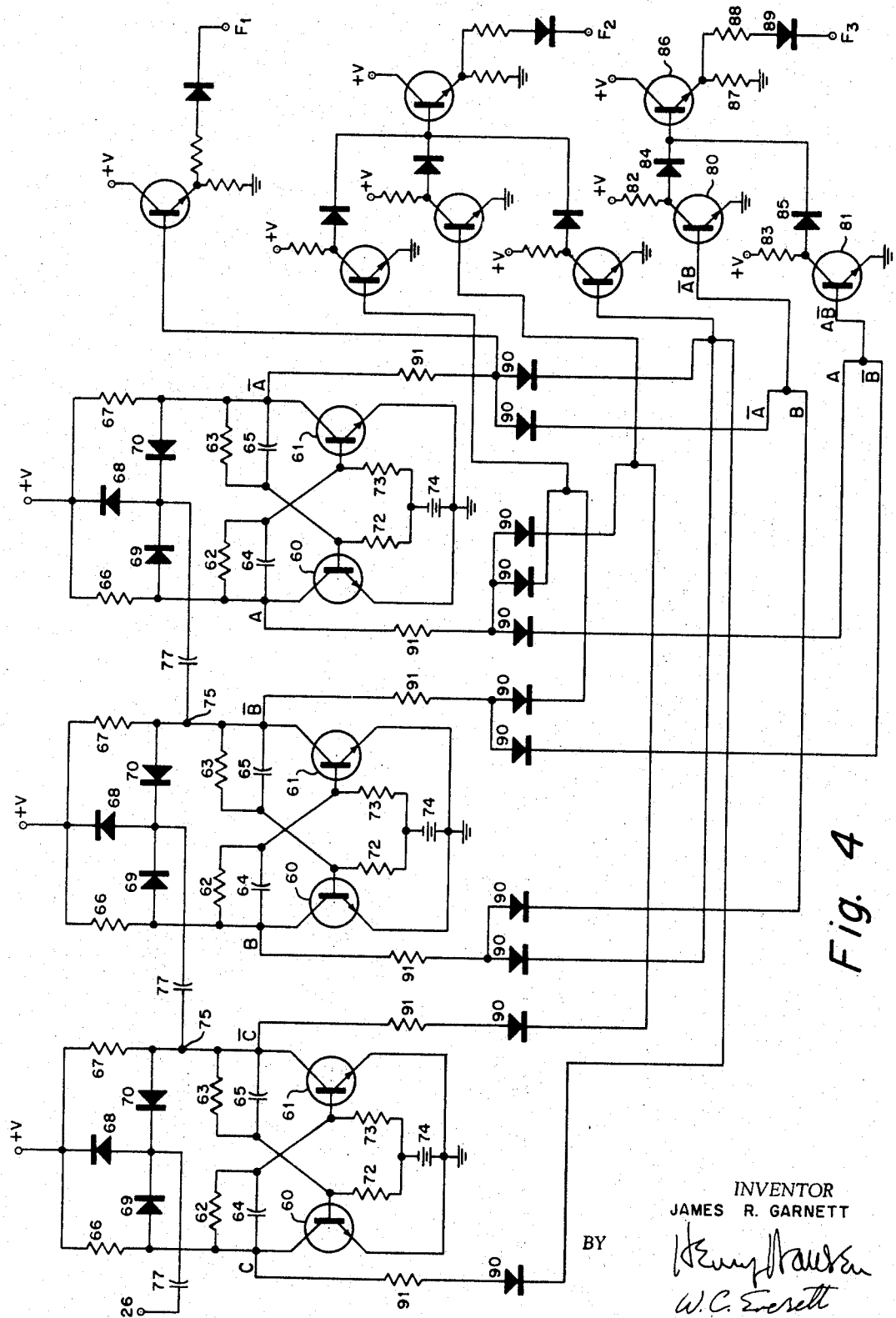
FIG. 4 shows in more detail the binary divide chain with the associated logic circuits of FIG. 1.

The diagram of a divide chain and logic circuit for the single phase system shown in FIG. 1 is described in FIG. 4. The binaries used are the same type of binaries shown in FIG. 6. A pulse comes into the divide chain 21–23 from the oscillator 20 at point 26, through a D-C blocking capacitor 77 and causes the binary 21 to change sides. When a positive voltage appears at the right side of binary 21, it reverses binary 22 through a D-C blocking capacitor 77, and a positive voltage on the right side of binary 22 will reverse binary 23 through a D-C blocking capacitor 77. It takes eight pulses from oscillator 20 to go through one cycle. Square wave F1 in FIG. 4 leads to drive circuit 25a, square wave F2 leads to 25b and square wave F3 leads to 25c. The operation of the logic circuits may be illustrated by the explanation as to F3. Transistors 80 and 81 are negative gates in series with resistances 82 and 83, respectively. The conditions for F3 will be satisfied if point $\overline{A}$ has a positive voltage at the same time that point B has a positive voltage or if point A has a positive voltage at the same time as point $\overline{B}$. Transistor 80 will have a voltage across it only if there is no current from either $\overline{A}$ or B. Transistor 81 will have a voltage across it only if there is no current from point A or $\overline{B}$. If points A and B are positive at the same time or if points $\overline{A}$ and $\overline{B}$ are positive at the same time the conditions are not satisfied and neither transistor 80 nor transistor 81 will have a voltage across it. If the conditions are satisfied, there will be a voltage across one or the other transistor, a current will go to a transistor 86, and current will flow through a resistor 87 causing a positive voltage there and a signal out. The condition for F1 is $\overline{A}$ positive, and the condition for F2 is $\overline{A}C$ or $\overline{A}B$ or $\overline{A}BC$. F1 occurs during the first four pulses of the cycle, F2 occurs during the four pulses after the first pulse, and F3 occurs during the four pulses after the first two pulses. Diodes 90 provide isolation between the signals. Series resistances 91 are also provided.

In a specific embodiment of the single phase system of FIG. 1 the desired output frequency for use in airplane power supplies is 400 cycles per second. Therefore, the oscillator 20 will be adjusted to oscillate at 3200 cycles per second or eight times the output frequency.

Although a 45° phase angle has been described and produces excellent results, it will be understood that the principle is applicable to other phase angles as well. For good harmonic cancellation it is necessary that the chosen phase angle be an integral division of 360° (i.e. one-eighth=45°, one-twelfth=30°). The number of square waves which produce the best results will vary for each angle. For 45° it is three. For 30° it is four.

Figure 8:
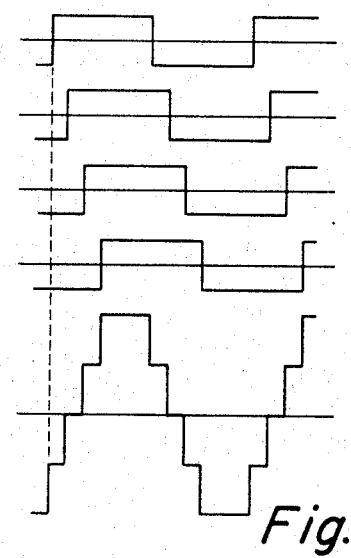
FIG. 8 represents waveforms in the embodiment of FIG. 5.

To produce a three phase system from the principles of the single phase system in FIG. 1, various means are available. One may, for example, use four binaries in the logic circuit with feedback from the fourth to second and from the third to first. This will offer four voltages in each phase 30° out of phase. One may also use a three stage ring counter connected to three sets of binaries similar to FIG. 1. However, the preferred three phase system is shown in FIG. 5 comprising an oscillator 50 sending an input pulse into a ring counter 51 having six stages A through F. Ring counters are well known in the art and need no description here. The construction of the ring counter 51 is such that it will send an output pulse in sequence from each of the stages in response to a sequence of input pulses. The result is to divide the original frequency by six. Binaries 52a–1 are bistable binaries which conduct on one side only and will reverse the side of conduction upon reception of an input pulse. Pulses are sent from the first stage of the ring counter 51 to the first and seventh binaries, from the second stage to the second and eighth binaries, etc. With proper initial biasing of each of the binaries 52, each binary will conduct on one side for a cycle of the ring counter 51 and then conduct on the other side for another cycle of the ring counter 51. Two square waves 180° out of phase may be picked off from each binary and sent to the corresponding inverter 28. The effect of each binary 52 is to divide the incoming frequency by two. The effect of the ring counter 51 is to divide the incoming frequency by six. The combined effect is to divide the original frequency by twelve and to make each inverter 28 30° out of phase with the one preceding. If the first four inverter outputs are linked, the second four inverter outputs are linked, and the third four inverter outputs are linked, as shown in FIG. 5, the result is a three phase voltage system, each phase having four square wave outputs lagging successively by 30° and producing the output waveform shown in FIG. 8. This waveform is desirable, having no harmonic distortion through the fourth harmonic and a diminished fifth harmonic.

FIG. 6 shows the circuit diagram of the binary 52. Two transistors 60 and 61 are provided in parallel. Resistors 62 and 63 in parallel with capacitors 64 and 65 are connected from the collector of each transistor to the base of the other. Resistances 66 and 67 are in series with each transistor. Diodes 68, 69 and 70 provide unidirectional coupling.

If one of the transistors e.g. 61 is conducting, the voltage across it will be low. This will in turn make a low signal across resistance 63 to the base of the opposite transistor 60 which in turn will mean low current through transistor 60 and a high voltage from collector to emitter causing a high signal current to the base of transistor 61. The binary is stable in either position. When a pulse is inserted between diodes 69 and 70, this momentarily increases the voltage across both transistors. There will momentarily be current to the base of transistor 60, which is blocked. It will begin to conduct, thereby decreasing the bias on the base of conducting transistor 61. The voltage across its collector will increase thereby increasing the signal to the base of blocked transistor 60 and in a very short time the binary will pass to the opposite stable configuration with transistor 60 conducting. Diode 68 permits current flow to the tops of resistances 66 and 67 only. Diodes 69 and 70 permit a small amount of current flow during any negative portion of the pulse. Optionally, resistances 72 and 73 may lead from the base of each transistor to a small negative voltage supply 74 to increase the effectiveness of the cutoff. It will be understood that when one side is conducting, it is effectively off, inasmuch as the collector to emitter voltage at the pickoff point 75 or 76 of that transistor is reduced to near zero. The outputs from pickoff points 75 and 76 lead into a transformer 71 wound such that two square waves 180° out of phase are produced in the outputs. These lead to the gates SCR1 and SCR2 of the inverters 28 as noted.

The same binary can be used in the divide chain of the single phase system, either four of them for 30° phase lag, or three of them for 45° phase lag. However, if a 30° phase lag is desired, the six stage ring counter should be used. If the 45° phase lag is desired, some form of count-by-four means must be provided, either a four stage ring counter or a set of two binaries with appropriate logic circuits.

The transformers 35, 42, 71 in all cases are wound on separate cores to avoid magnetic interference and improve the waveforms of the output voltages. The transformers for the small signal parts of the circuit may be wound on toroid transformers of ferrite composition. The transformers for the power output section will have to be wound on metal cores capable of withstanding high power.

The specific embodiment uses a 400 cycle per second frequency for use in aircraft power supplies. The oscillator for the single phase system will have to be 3200 cycles per second, and the oscillator for the three phase system will have to be 4800 cycles per second. The contemplated voltage supply is a 28 volt storage battery. However, the invention is equally applicable to other frequencies and/or other voltage supplies.

Obviously, many modifications and variations of the present invention are possible in the light of the above teachings. It is, therefore, to be understood that within the scope of the appended claims, the invention may be practiced otherwise than as specifically described.

What is claimed is:

1. A sine wave approximation power supply having a three-phase output comprising:
    a plurality of output linked square wave power supplies divided in three groups each having a second plurality of output linked square wave power supplies, said square waves in each of said groups being successively out of phase with the other said waves in the same said group by a predetermined amount which is an integral division of 360°, each of said square wave power supplies comprising:
        a pair of silicon controlled rectifiers each having a gate, an anode and a grounded cathode;
        a first transformer having an input coil and an output coil, the input coil being connected across the anodes of said rectifiers;
        a voltage supply connected from ground to the center of said input coil; and
        means to supply to the gates of said rectifiers a pair of input square waves 180° out of phase with each other of magnitude sufficient to cause conduction during one-half the cycle, each pair of input square waves being out of phase with the pairs of waves in successive square wave power supplies in the same said group by said predetermined amount which is an integral division of 360° and the first pair of input square waves of the first group being out of phase with the first pairs of input square waves of the second and third groups by 120° and 240°, respectively.

2. A three phase sine wave approximation power supply as recited in claim 1 having a capacitance in parallel with the input coil of said transformer across the anodes of said rectifiers and an inductance connected between the common point of the cathodes of said rectifiers and ground.

3. A sine wave approximation power supply as recited in claim 1 wherein said means to supply a pair of square waves to each pair of rectifiers is a drive circuit comprising:
    a second transformer having an input coil and an output coil, said output coil being center tapped and wound so as to produce two outputs 180° out of phase with each other,
    a binary flip-flop element having two pickoff points, said element being bistable so that one or the other pickoff point will alternatively have a voltage to ground thereon, said element having an input point at which an input pulse will effect a reversal of the binary element from one stable condition to the other, said pickoff points being linked to each of the two opposite ends of the input coil of the transformer, said input coil being center tapped to ground, and means to apply to said input point the frequency which is twice the desired output frequency.

4. A three phase sine wave approximation power supply as recited in claim 3 wherein the number of output square wave power supplies is twelve divided in three groups of four, the successive phase angle differences are 30° and said means to supply a frequency to each drive circuit comprises:
    an oscillator means for producing a frequency twelve times the desired output frequency,
    a six stage ring counter connected to said oscillator means and having its first stage connected to the first and seventh of said drive circuits, its second stage to the second and eighth of said drive circuits and each of the other stages being connected to successive drive circuits in the same manner.

5. A three phase sine wave approximation power supply as recited in claim 4, the binary flip-flop element comprising:
    a pair of transistors with a first set of common ends grounded,
    a parallel RC coupling from one of a second set of common ends of said transistors to the base of the other of said transistors,
    a parallel RC coupling from the other of said second set of common ends to the base of said one transistor, said second set of common ends of said transistors being connected through resistances to a voltage supply,
    and a pulse input point connected to the input point of said voltage supply.

6. A three phase sine wave approximation power supply as recited in claim 5, said binary flip-flop elements further comprising:
a diode allowing current flow only from said pulse input point to said input of said voltage supply means and a set of diodes allowing current flow only from said second set of common ends of said transistors to said pulse input point.

References Cited

UNITED STATES PATENTS

| | | | |
|---|---|---|---|
| 2,547,162 | 3/1951 | Kidd | 321—27 X |
| 2,899,572 | 8/1959 | Skelton et al. | 307—106 |
| 3,052,833 | 9/1962 | Coolidge et al. | 321—5 |
| 3,060,363 | 10/1962 | Jensen | 321—5 |
| 3,096,472 | 5/1963 | Elliott et al. | 321—45 |
| 3,264,548 | 8/1966 | King | 321—45 |
| 3,271,654 | 9/1966 | Schlabach | 321—5 |
| 3,010,062 | 9/1961 | Van Emden | 321—45 X |
| 3,144,599 | 8/1964 | Brahm | 321—7 |
| 3,256,244 | 9/1966 | Byloff et al. | 321—61 |
| 3,304,484 | 2/1967 | Kernick et al. | 321—5 |

FOREIGN PATENTS 1,340,004   9/1963   France.

JOHN F. COUCH, *Primary Examiner.*

W. SHOOP, *Assistant Examiner.*